Patented Aug. 16, 1932

1,871,946

UNITED STATES PATENT OFFICE

GÉRALD BONHÔTE, OF BASEL, SWITZERLAND, ASSIGNOR TO SOCIETY OF CHEMICAL INDUSTRY IN BASLE, OF BASEL, SWITZERLAND

AZO-DYESTUFFS AND PROCESS OF MAKING SAME

No Drawing. Application filed October 21, 1931, Serial No. 570,263, and in Switzerland October 25, 1930.

The present invention relates to the manufacture of new azo-dyestuffs. It comprises the process of making these dyestuffs, and the new dyestuffs themselves.

It has been found that new dyestuffs are obtained by coupling an arylide of 2:3-hydroxynaphthoic acid or a derivative thereof further substituted in the naphthalene nucleus and capable of coupling in 1-position, with the diazo-compound of a monoacidylated paraphenylenediamine of the general formula

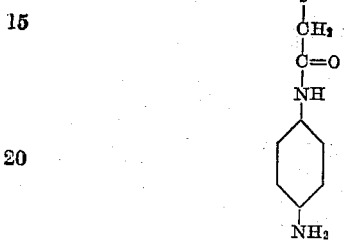

wherein $z$ stands for a residue containing an unsulfonated aryl radicle which is incapable of coupling, such as for example

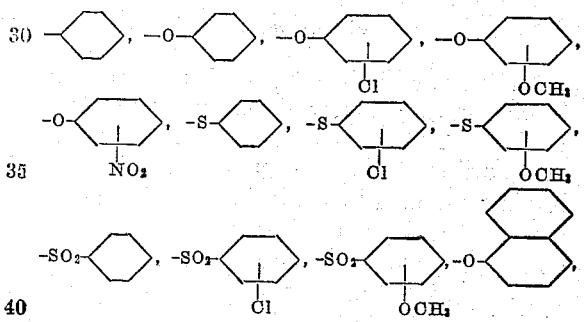

or the like, and further wherein the aryl nucleus of the paraphenylenediamine can carry substituents from a group of substituents consisting of halogen, alkyl or alkoxy.

Among these acidylated paraphenylenediamine derivatives those are particularly valuable which correspond to the general formula

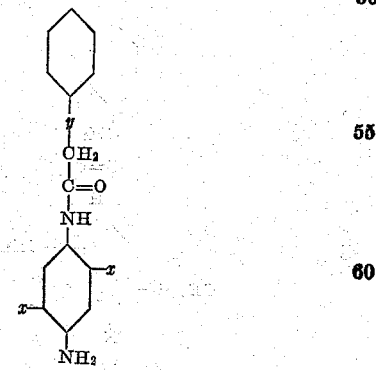

in which one of the $x$'s stands for a substituent of the group consisting of halogen, alkyl or alkoxy, the other $x$ stands for a hydrogen atom or for a substituent of the just defined group, $y$ stands for O or S, and in which the aryl nucleus linked to the bridge $y$ can also carry substituents of the above defined group.

The new dyestuffs, which therefore correspond to the general formula

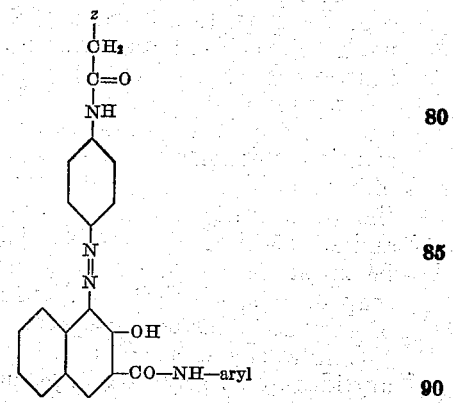

wherein z has the above defined meaning, are distinguished by their fastness to light; when dried they may be converted into red, violet and blue pigments. The dyeings obtained by producing the dyestuffs on a fibre are distinguished by their fastness to light and other advantageous properties. The dyestuffs may also be produced by coupling in the presence of a suitable substratum.

The following examples illustrate the invention, the parts of Example 1 being by weight:—

*Example 1*

28.6 parts of 1-amino-2:5-dimethoxy-4-phenylacetylaminobenzene are diazotized in the usual manner and introduced into a solution of 26.3 parts of the anilide of 2:3 hydroxynaphthoic acid, 50 parts of caustic soda solution of 30 per cent. strength, 30 parts of calcined sodium carbonate and 2000 parts of water.

The dyestuff which is formed and which corresponds to the formula

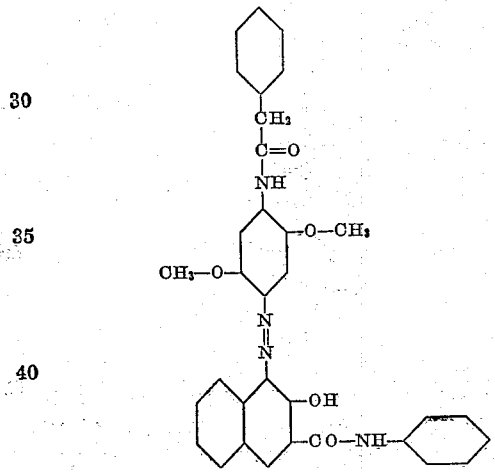

separates immediately in the form of a blue precipitate which is separated by filtration and dried.

*Example 2*

Cotton yarn is impregnated with a solution containing per liter 5 grams of 2:3-hydroxynaphthoic acid-α-naphthylamide, 10 cc. of caustic soda solution of 34° Bé. and 10 cc. of Turkey red oil. The material is well wrung out and the dyeing is developed in a diazo-solution which has been neutralized by means of sodium bicarbonate and contains per liter the diazo-compound from 3 grams of 1-amino-2:5-dimethoxy-4-phenylacetyl-amino-benzene; the material is then rinsed and soaped. There is obtained a pure blue dyeing of very good fastness properties.

Similar shades are obtained by using other arylides of 2:3-hydroxynaphthoic acid, for example, the β-naphthylamide or the ortho-toluidide. Violet shades are for example obtained by using the ortho or para-anisidide, the 5-chloro-2-toluidide or the para-chloranilide of 2:3-hydroxynaphthoic acid.

Similar results are obtained in piece dyeing or in printing.

*Example 3*

Cotton yarn is impregnated at 25–30° C., with a solution containing per liter 3 grams of 2:3-hydroxynaphthoic acid para-chloranilide, 6 cc. of caustic soda solution of 34° Bé., 5cc. of Turkey red oil and 3 cc. of a solution of formaldehyde of 40 per cent. strength, the proportion of goods to liquor being 1:20. The material is well wrung out and the dyeing is developed in a solution, neutralized by means of sodium bicarbonate, containing per liter the diazo-compound from 2.2 grams of 4-phenoxyacetylamino-2:5-dimethoxy-1-aminobenzene. The goods are then rinsed and soaped. There is obtained a very pure violet dyeing of very good properties of fastness. The dyestuff thus produced on the fiber also corresponds to the formula

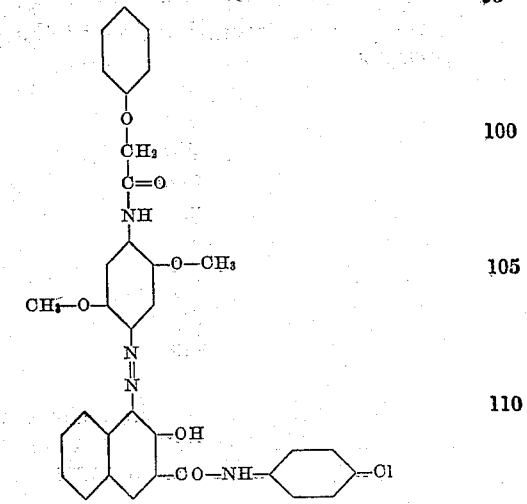

*Example 4*

Cotton yarn is impregnated with an alkaline grounding liquor containing per liter 4 grams of 2:3-hydroxynaphthoic acid ortho-phenetidide and well wrung out. The dyeing is developed in a solution, neutralized by means of sodium bicarbonate, containing per liter the diazo-compound from 2 grams of 4-(1'-methyl)-phenoxy-acetylamino-2:5-dimethoxy-1-amino-benzene. There is obtained a pure greenish-blue dyeing which is remarkably fast.

The following table gives the shades on cotton produced with some further dyestuffs obtainable according to the present invention:—

| # | Compound of the formula $z-CH_2-C(=O)-NH-\text{[ring with }x_1, x_2\text{]}-NH_2$ | Arylide of the 2:3-hydroxy-naphthoic acid | Shade |
|---|---|---|---|
| (1) | $z=$ phenyl; $x_1=H$, $x_2=H$ | anilide | Bordeaux |
| (2) | $z=$ phenyl-O—; $x_1=CH_3$, $x_2=CH_3$ | o-anisidide | Bluish red |
| (3) | $z=$ phenyl-O—; $x_1=CH_3$, $x_2=CH_3$ | p-phenetidide | Bluish red |
| (4) | $z=$ phenyl-O—; $x_1=CH_3$, $x_2=H$ | p-phenetidide | Bordeaux red |
| (5) | $z=$ phenyl-O—; $x_1=H$, $x_2=CH_3$ | anilide | Bordeaux red |
| (6) | $z=$ phenyl-O—; $x_1=Cl$, $x_2=Cl$ | p-chloranilide | Ruby red |
| (7) | $z=$ phenyl-O—; $x_1=Cl$, $x_2=Cl$ | 5-chloro-2-toluidide | Ruby red |
| (8) | $z=$ phenyl-O—; $x_1=O-C_2H_5$, $x_2=O-C_2H_5$ | a-naphthylamide | Violet |
| (9) | $z=$ (CH$_3$)phenyl-O—; $x_1=O-CH_3$, $x_2=O-CH_3$ | m-xylidide | Violet |
| (10) | $z=$ (CH$_3$)phenyl-O—; $x_1=O-CH_3$, $x_2=O-CH_3$ | m-phenylenediimide | Reddish blue |
| (11) | $z=$ (CH$_3$)phenyl-O—; $x_1=O-CH_3$, $x_2=O-CH_3$ | o-toluidide | Violet |
| (12) | $z=$ (CH$_3$)phenyl-O—; $x_1=CH_3$, $x_2=CH_3$ | o-chloranilide | Red |
| (13) | $z=CH_3$-phenyl-O—; $x_1=O-CH_3$, $x_2=O-CH_3$ | β-naphthylamide | Violet |
| (14) | do. | m-nitranilide | Blue violet |
| (15) | do. | m-xylidide | Violet |
| (16) | do. | 3:4-dichloranilide | Violet |
| (17) | do. | o-phenetidide | Blue |
| (18) | $z=CH_3$-phenyl-O—; $x_1=CH_3$, $x_2=CH_3$ | p-anisidide | Ruby red |
| (19) | $z=$ (O-CH$_3$)phenyl-O—; $x_1=O-CH_3$, $x_2=O-CH_3$ | o-anisidide | Violet |
| (20) | $z=$ (Cl)phenyl-O—; $x_1=O-CH_3$, $x_2=O-C_2H_5$ | 5-chlor-2-toluidide | Violet |
| (21) | do. | metoxylidide | Violet |
| (22) | $z=$ Cl-(CH$_3$)phenyl-O—; $x_1=O-CH_3$, $x_2=O-CH_3$ | β-naphthylamide | Violet |
| (23) | $z=CH_3$-phenyl-S—; $x_1=O-CH_3$, $x_2=O-CH_3$ | β-naphthalide | Blue violet |
| (24) | do. | p-chloranilide | Violet |
| (25) | $z=CH_3$-phenyl-SO$_2$—; $x_1=O-CH_3$, $x_2=O-CH_3$ | anilide | Violet |
| (26) | $z=$ naphthyl-O—; $x_1=O-CH_3$, $x_2=O-CH_3$ | anilide | Violet |

What I claim is:—

1. As new products the unsulfonated azodyestuffs of the general formula

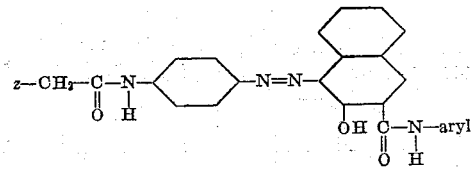

wherein $z$ stands for a residue containing a radicle of the benzene or of the naphthalene series incapable of coupling, which products are dark red to violet and blue powders, and which, when produced on the fiber, dye the same similar tints.

2. As new products the unsulfonated azodyestuffs of the general formula

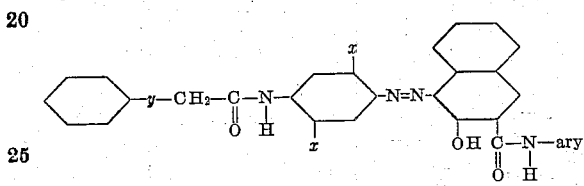

wherein one of the $x$'s stands for a substituent from a group consisting of halogen, alkyl or alkoxy, the other $x$ stands for a hydrogen atom or a substituent of the above defined group, $y$ stands for O or S, and wherein the aryl nucleus attached to the bridge $y$ may also carry substituents of the above defined group, which products are dark red to violet and blue powders, and which, when produced on the fiber, dye the same similar tints.

3. As new products the unsulfonated azodyestuffs of the general formula

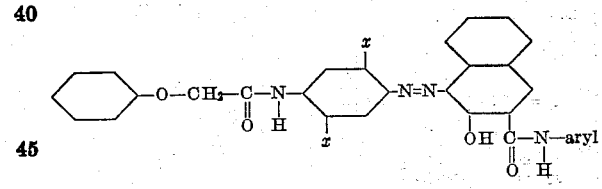

wherein one of the $x$'s stands for a substituent from a group consisting of halogen, alkyl or alkoxy, the other $x$ stands for a hydrogen atom or a substituent of the above defined group, and wherein the aryl nucleus attached to the oxygen bridge may also carry substituents of the above defined group, which products are dark red to violet and blue powders, and which, when produced on the fiber, dye the same similar tints.

4. As new products the unsulfonated azodyestuffs of the general formula

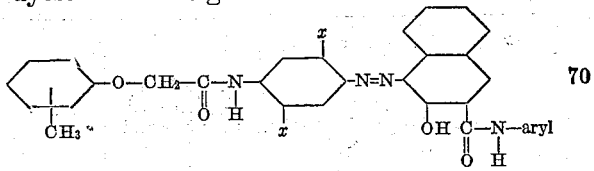

wherein one of the $x$'s stands for a substituent from a group consisting of halogen, alkyl or alkoxy, and the other $x$ stands for a hydrogen atom or a substituent of the above defined group, which products are dark red to violet and blue powders, and which, when produced on the fiber, dye the same similar tints.

5. As new products the unsulfonated azodyestuffs of the general formula

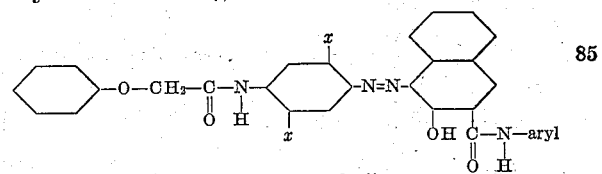

wherein the two $x$'s stand for alkyl or alkoxy, which products are dark red to violet and blue powders, and which, when produced on the fiber, dye the same similar tints.

6. As a new product the unsulfonated azodyestuff of the formula

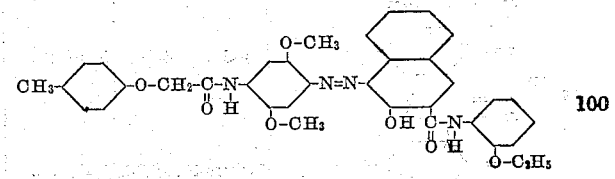

which product is a blue-violet powder, yielding on cotton after soaping fast blue tints.

7. As a new product the unsulfonated azodyestuff of the formula

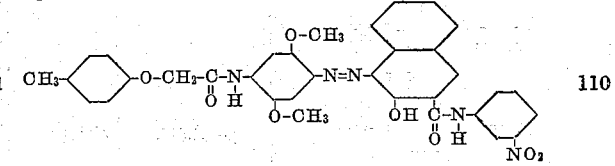

which product is a blue-violet powder, yielding on cotton after soaping fast violet tints.

8. As a new product the unsulfonated azodyestuff of the formula

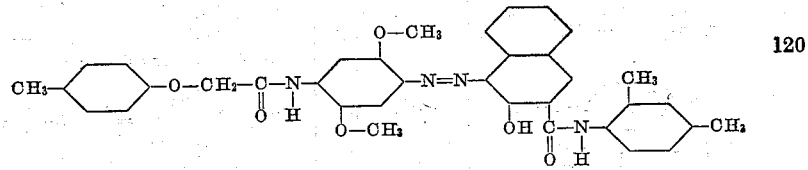

which product is a blue-violet powder, yielding on cotton after soaping fast violet tints.

In witness whereof I have hereunto signed my name this 10th day of October, 1931.

GÉRALD BONHÔTE.